United States Patent Office 3,226,344
Patented Dec. 28, 1965

3,226,344
POLYURETHANE FOAM FORMING
COMPOSITIONS
Seymour S. Schwartz and Norman Bilow, Los Angeles,
Calif., assignors to Hughes Aircraft Company, Culver
City, Calif., a corporation of Delaware
No Drawing. Filed June 26, 1962, Ser. No. 205,232
5 Claims. (Cl. 260—2.5)

This invention relates to storable, pre-mixed compositions for the production of polyurethane foams and particularly such compositions made up of solid components of relatively high stability and low toxicity at ambient temperature and moisture conditions.

In order to produce polyurethane foam compositions which can be pre-mixed and are storable for prolonged periods of time at ambient conditions, the solid diisocyanate used in the composition should be one which exhibits very low reactivity in the solid state at room temperature, as compared with the liquid diisocyanates which are normally used in polyurethane foam production. For example, it has been found that liquid diisocyanates are not sufficiently stable at ordinary conditions of temperature and relative humidity to be stored, while mixed with the other components of the foam production composition, for prolonged periods of time. Furthermore, after such storage, the stored compositions cannot be satisfactorily reacted for the production of suitable polyurethane foams at a chosen time and place. In other words it has been found that reactive polyurethane foam compositions of the prior art are not storable, in pre-mixed composition form, for any prolonged period of time; and that those compositions of the prior art, which are storable, do not react satisfactorily when it is desired to produce suitable polyurethane foam structures from the stored compositions.

Accordingly, it is a primary object of this invention to provide a stable, storable, one-part composition for the production of suitable polyurethane foams which exhibits both satisfactory storable and stability properties, as well as satisfactory reaction and foam production characteristics after storage.

Another object of this invention is to provide a solid polyurethane foam composition made up of solid components which can be stored pre-mixed without reacting at ambient conditions for prolonged periods of time and which will exhibit suitable reaction and foam production characteristics when it is desired to react the foam composition after storage.

Additional objects will become apparent from the following description which is given primarily for purposes of illustration and not limitation.

Stated in general terms, the objects of this invention are attained by providing a solid polyurethane foam composition which includes an equivalent weight of a solid polyisocyanate, and about an equivalent weight of a solid polyol or polyhydric alcohol which will react with the diisocyanate to form a polyurethane resin. It has been found that solid diaryl diisocyanates, such as solid disubstituted diphenyl diisocyanates and solid diphenylmethane diisocyanates, are satisfactory for use as the polyisocyanate, and that the sterically hindered, that is, the solid 3,3'-substituted, 4,4'-diphenyl diisocyanates are especially satisfactory. The substituent preferably is an alkyl group or an alkoxy group, and especially such a group having less than about five carbon atoms per substituent group.

Examples of suitable solid diisocyanates are as follows: 3,3'-dimethoxy-4,4'-biphenylene diisocyanate (dianisidine diisocyanate); 3,3'-dimethyl-4,4'-biphenylene diisocyanate, and diphenylmethane-4,4'-diisocyanate.

The solid polyol can be a suitable trifunctional triol which will react with the diisocyanate both to form a polyurethane chain and to form chain cross-links, but somewhat better control of chain-formation and chain cross-linking is achieved when a suitable diol or glycol is used to form the polyurethane chain, and a suitable triol is used to perform the desired chain cross-linking function. It has been found that solid, aryl-substituted aliphatic glycols and diaryl diols, such as solid diphenylmethane diols, are satisfactory polyurethane chain-forming diols for use in the foam compositions of this invention. Also, it has been found that solid trihydroxy aliphatic alcohols are satisfactory chain cross-linking agents. When both a chain formation diol and a chain cross-linking triol are employed in the composition of this invention, about a half equivalent weight of each is employed with an equivalent weight of the solid polyisocyanate.

Suitable examples of solid diols are dimethyl hexane diol and p,p'-bis-(β-hydroxyethoxy)-2,2 diphenylpropane, and suitable examples of triols are trimethylol propane and tris(hydroxymethyl) amino methane.

For the purpose of forming water in the foam composition, when it is desired to produce the polyurethane foam by reacting the pre-mixed composition, after it has been stored, a small amount of water containing material or "blowing agent," such as boric acid, certain water releasable hydrated salts, etc., is incorporated in the mixture to form gaseous carbon dioxide by reaction of the released water with the fused diisocyanate. An amount of about 1 to 5%, preferably about 2 to 4% by weight of this material, based upon the mixture of diisocyanate and polyols, is used.

For the purpose of reducing the surface tension of the melted reaction mixture when foam formation takes place, a small amount of surfactant, such as about 1 to 5%, preferably 2 to 4% by weight, based upon the mixture of diisocyanate and polyols, is used. By reducing the surface tension of the melted foaming mixture, the cell size of the foam is regulated and a more even foam of lower density, of the desired magnitude is produced. Silicone oils, such as silicone-glycol copolymer, worked very well in this respect. Other examples of suitable surfactants are dimethyl polysiloxanes and vegetable oils.

In addition, a small amount of a suitable catalyst, such as about .1 to 1%, based upon the mixture of diisocyanate and polyol, is used to accelerate the foam producing reaction of the molten reaction mixture in cases where the stability of the reactants makes it desirable. Examples of such catalysts are triethylene diamine, triethylamine, dibutyltin di-2 ethyl hexoate and stannous octoate.

Suitable examples of such solid mixtures of polyurethane foam compositions are as follows.

*Example I*

| Component | Function | Equivalent Weight | Equivalents | Grams |
|---|---|---|---|---|
| Diphenyl methane 4, 4'-diisocyanate. | Diisocyanate | 125 | .5 | 63.0 |
| p,p'Bis-(β hydroxy-ethoxy)-2,2-diphenyl-propane. | Diol chain-former. | 158 | .4 | 63.0 |
| Trimethylolpropane | Triol crosslinker | 45 | .15 | 6.7 |
| Boric acid | Blowing agent | | | 7.0 |
| Silicone oil | Surfactant | | | 2.5 |

The components given in the above table were mixed together until a slightly pasty material was formed. The pasty consistency was produced as the result of the occurrence of slight degree of chemical reaction. The resulting pasty mixture was sealed against moisture and permitted to stand at ambient temperature for about 2 days. The resulting dry mixture was ground to produce a powder. The resulting powder was stored for a number of days until it was desired to produce a foam. The foam was produced by heating the powder at a temperature from about 80° to about 120° C. The foam thus produced has a density of from 2 to 4 lbs./cu. ft. and a compressive strength of from 16 to 25 p.s.i.

*Example II*

| Component | Function | Equivalent Weight | Equivalents | Grams |
|---|---|---|---|---|
| Dianisidine diisocyanate. | Diisocyanate. | 149 | .5 | 45.0 |
| p,p'Bis (β hydroxy-ethoxy) 2,2 diphenylpropane. | Diol chain-former. | 158 | .16 | 25.3 |
| Trimethylolpropane. | Triol cross-linker. | 45 | .15 | 6.8 |
| Boric acid. | Blowing agent. | | | 2.0 |
| Silicone oil. | Surfactant. | | | 2.0 |
| Dibutyl tin di-2-ethyl hexoate. | Catalyst. | | | .06 |

The components given in the above table were mixed together until a reaction commenced and the temperature rose to about 40 to 50° C. Mixing then was terminated and the resulting mixture was cooled rapidly to prevent further reaction. The resulting brittle material was ground to a powder which was stored for several days until it was desired to produce a foam. The foam was produced by heating the powdered mixture to about 125 to 150° C. The foam thus produced had a density of from 2 to 5 lbs./cu. ft. and a compressive strength of from 15 to 50 p.s.i., depending upon the density produced. It exhibited good heat resistance up to 350° F.

The pre-mixed foam compositions of this invention can be used to produce foams of good quality in an evacuated atmosphere. When used for producing polyurethane foam in a vacuum, the blowing agent is omitted from the foam compositions described hereinabove. Upon heating and fusing the solid, one-part, pre-mixed foam composition of this invention in a vacuum the vapor pressure of the fused mixtures is sufficiently great to produce enough vapor to form a low density polyurethane foam of good compressive strength and other desirable properties.

For example, when the solid foam composition of Example II given above, minus the boric acid blowing agent, is heated in a vacuum, it commences to foam at 175° F. and continues to foam at temperatures up to 350° F. The foam produced is a good, tough material having a density of 2 to 5 lbs./cu. ft. The materials used in the foam compositions of this invention are of low toxicity as compared to the prior art liquid polyurethane foam components because of the very low vapor pressure of the instant solid components.

Obviously many other modifications and variations of the present invention are possible in the light of the above teachings. It is therefore to be understood that within the scope of the appended claims the invention can be practiced otherwise than as specifically described.

What is claimed is:
1. A polyurethane foam-forming composition consisting essentially of about one equivalent weight of 3,3'-dimethoxy 4,4'-biphenylene diisocyanate, about .5 equivalent weight of p,p'-bis-(β-hydroxyethoxy)-2,2-diphenylpropane, about .5 equivalent weight of trimethylolpropane, about 2.5% of a surfactant and about .1% of a catalyst the percentage of said surfactant and said catalyst being by weight of the total of said composition, said composition being prepared by mixing and partially reacting the ingredients of the composition, and cooling the partially reacted mixed and substantially stable composition.

2. A polyurethane foam-forming composition consisting essentially of about one equivalent weight of diphenylmethane 4,4'-diisocyanate, about .8 equivalent weight of p,p'-bis-(β-hydroxyethoxy)-2,2-diphenylpropane, about .3 equivalent weight of trimethylolpropane, about 3% of boric acid and about 2.0% of a surfactant the percentage of said boric acid and said surfactant being by weight of the total of said composition, said composition being prepared by mixing and partially reacting the ingredients of the composition, and cooling the partially reacted mixed and substantially stable composition.

3. A polyurethane foam-forming composition consisting essentially of about one equivalent weight of a diisocyanate selected from the group consisting of 3,3'-dimethoxy-4,4'-biphenylene diisocyanate and diphenylmethane-4,4'-diisocyanate and about one equivalent weight of a mixture of p,p'-bis-(β-hydroxyethoxy)-2,2-diphenylpropane and trimethylolpropane prepared by mixing and partially reacting the ingredients of the composition and cooling the partially reacted mixed and substantially stable composition.

4. A polyurethane foam-forming composition consisting essentially of about one equivalent weight of 3,3'-dimethoxy-4,4'-biphenylene diisocyanate and about one equivalent weight of a mixture of p,p'-bis-(β-hydroxyethoxy)-2,2-diphenylpropane and trimethylolpropane prepared by mixing and partially reacting the ingredients of the composition and cooling the partially reacted mixed and substantially stable composition.

5. A polyurethane foam-forming composition consisting essentially of about one equivalent weight of diphenyl methane-4,4'-diisocyanate and about one equivalent weight of a mixture of p,p'-bis(β-hydroxyethoxy)-2,2-diphenylpropane and trimethylolpropane prepared by mixing and partially reacting the ingredients of the composition and cooling the partially reacted mixed and substantially stable composition.

References Cited by the Examiner

UNITED STATES PATENTS

| 2,284,637 | 6/1942 | Catlin | 260—2.5 |
| 2,921,915 | 1/1960 | Brochhagen et al. | 260—2.5 |
| 3,036,999 | 5/1962 | Worsley et al. | 260—2.5 |
| 3,076,770 | 2/1963 | Saunders et al. | 260—2.5 |
| 3,078,240 | 2/1963 | Hoshino et al. | 260—2.5 |

FOREIGN PATENTS

| 537,295 | 2/1957 | Canada. |

LEON J. BERCOVITZ, *Primary Examiner.*

UNITED STATES PATENT OFFICE
CERTIFICATE OF CORRECTION

Patent No. 3,226,344                        December 28, 1965

Seymour S. Schwartz et al.

It is hereby certified that error appears in the above numbered patent requiring correction and that the said Letters Patent should read as corrected below.

Column 2, lines 29 and 30, for "materail" read -- material --; same column 2, in the table, fifth column, line 4 thereof, for "7.0" read -- 4.0 --.

Signed and sealed this 25th day of October 1966.

(SEAL)
Attest:

ERNEST W. SWIDER
Attesting Officer

EDWARD J. BRENNER
Commissioner of Patents